(12) United States Patent
Wang et al.

(10) Patent No.: US 8,482,703 B2
(45) Date of Patent: Jul. 9, 2013

(54) TRANSFLECTIVE LIQUID CRYSTAL DISPLAY HAVING TRANSPARENT CONDUCTIVE LAYER WITH OPENING

(75) Inventors: Wen-Chun Wang, Taichung (TW); Ming-Chang Yu, Tai Chung (TW); Yung-Cheng Chang, Tai Chung County (TW)

(73) Assignees: Dongguan Masstop Liquid Crystal Display Co., Ltd., Dongguan, Guangdong Province (CN); Wintek Corporation, Taichung (TW)

( * ) Notice: Subject to any disclaimer, the term of this patent is extended or adjusted under 35 U.S.C. 154(b) by 291 days.

(21) Appl. No.: 12/835,145

(22) Filed: Jul. 13, 2010

(65) Prior Publication Data

US 2011/0013126 A1 Jan. 20, 2011

(30) Foreign Application Priority Data

Jul. 14, 2009 (TW) .............................. 98123674 A

(51) Int. Cl.
*G02F 1/1335* (2006.01)
(52) U.S. Cl.
USPC ............................. 349/114; 349/106; 349/129
(58) Field of Classification Search
USPC ......................................... 349/114, 106, 129
See application file for complete search history.

(56) References Cited

U.S. PATENT DOCUMENTS

| 2006/0232729 | A1* | 10/2006 | Rho | 349/106 |
| 2007/0085949 | A1* | 4/2007 | Chang et al. | 349/114 |
| 2009/0122240 | A1* | 5/2009 | Lim | 349/106 |

FOREIGN PATENT DOCUMENTS

TW 200708804 8/2005

* cited by examiner

*Primary Examiner* — Lauren Nguyen
(74) *Attorney, Agent, or Firm* — Muncy, Geissler, Olds & Lowe, PLLC

(57) ABSTRACT

A transflective liquid crystal display is provided which includes a color-filter substrate, an active matrix substrate, and a liquid crystal layer interposed between them. The active matrix substrate includes a first transparent substrate and includes a plurality of switching devices, a plurality of transparent pixel electrodes and a plurality of reflective pixel electrodes formed on the first transparent substrate. The color-filter substrate includes a second transparent substrate, a first and second transparent conducting layers and a dielectric layer. The first transparent conducting layer is interposed between the second transparent substrate and the second transparent conducting layer, and the dielectric layer is interposed between the first and second transparent conducting layers. The second transparent conducting layer in each pixel area has at least one opening. The openings positionally correspond to the reflective pixel electrodes.

13 Claims, 13 Drawing Sheets

TRANSFLECTIVE LIQUID CRYSTAL DISPLAY HAVING TRANSPARENT CONDUCTIVE LAYER WITH OPENING

BACKGROUND OF THE INVENTION (a) Field of the Invention

The invention relates to a transflective liquid crystal display and, more particularly, relates to a transflective liquid crystal display having optimum gamma curves for a transmissive area and a reflective area of the transflective liquid crystal display.

(b) Description of the Related Art

FIG. 1A partially shows a schematic cross-section of a conventional transflective liquid crystal display. Referring to FIG. 1A, the transflective liquid crystal display 90 includes a color filter substrate 912, an array substrate 914 and a liquid crystal layer 916. The color filter substrate 912 and the array substrate 914 are opposite each other. The liquid crystal layer 916 is interposed between the substrates 912 and 914 and has negative dielectric anisotropy, so that the liquid crystal molecules are in vertical alignment when a voltage is not applied thereto. Switching devices such as thin-film transistors (not shown), transparent pixel electrodes 922 and reflective pixel electrodes 923 are formed on a transparent substrate 928 of the array substrate 914. In the color filter substrate 912, a color filter layer 930 is formed on a transparent substrate 926, and a common electrode 924 is formed on the color filter layer 930. The color filter layer 930 includes a black matrix layer 934 and filter traces 932.

In the conventional transflective liquid crystal display 90, only a single gap is formed between the color filter substrate 912 and the array substrate 914. Hence, it is not easy to adjust the gamma values for a transmissive area and a reflective area to approach a standard gamma curve 2.2, and therefore resulting in inferior image quality. In a conventional design, a display having an organic layer is used to solve the above problem. FIG. 1B partially shows a schematic cross-section of another conventional transflective liquid crystal display. The conventional transflective liquid crystal display 90B is similar to the transflective liquid crystal display 90 shown in FIG. 1A, except the transflective liquid crystal display 90B further includes an organic layer 924 between the reflective pixel electrode 923 and transparent substrate 928. The formation of organic layer 924 enables the transflective liquid crystal display 90B to have two different gaps between the color filter substrate 912 and the array substrate 914. Compared with the transflective liquid crystal display 90, in the transflective liquid crystal display 90B, the light 12 passing through the liquid crystal layer 916 in the reflective area follows a light path similar to the light path of the light I1 passing through the liquid crystal layer 916 in the transmissive area. Accordingly, the gamma values for the transmissive area and the reflective area of the transflective liquid crystal display 90B are relatively easy to be adjusted to approach a standard gamma curve 2.2.

In addition, when a user watches a vertically-aligned LCD at a large viewing angle, a color washout phenomenon is often observed where the skin color tends to appear in pale blue or white. In addition, when a conventional liquid crystal display is touched by a finger of a user, the orientations of liquid crystal molecules become disordered to cause a white or black fingerprint, which is often referred to as fingerprint mura. In the conventional liquid crystal display, it takes a relatively long time for the liquid crystal molecules to recover from the disordered state, so the fingerprint mura is often observed by human eyes.

BRIEF SUMMARY OF THE INVENTION

One object of an embodiment of the invention is to provide a transflective liquid crystal display having reduced color washout observed at a large viewing angle. One object of another embodiment of the invention is to provide a transflective liquid crystal display having reduced fingerprint mura. One object of another embodiment of the invention is to provide a transflective liquid crystal display having fine image quality. One object of another embodiment of the invention is to provide a transflective liquid crystal display having optimum gamma curves for a transmissive area and a reflective area of the transflective liquid crystal display.

According to an embodiment of the invention, a transflective liquid crystal display is provided. The transflective liquid crystal display comprises an array substrate, a color filter substrate and a liquid crystal layer. The liquid crystal layer disposed between the array substrate and the color filter substrate. The array substrate comprises a first transparent substrate, a plurality of switching devices and a plurality of reflective and transparent pixel electrodes formed on the first transparent substrate. Each switching device is electrically connected to one of the transparent pixel electrodes and one of the reflective pixel electrodes. The color filter substrate has a plurality of pixel areas, each pixel area positionally corresponds to one of the transparent pixel electrodes and at least one of the reflective pixel electrodes. The color filter substrate comprises a second transparent substrate, a first transparent conductive layer, a second transparent conductive layer, and a dielectric layer. The first transparent conductive layer is disposed between the second transparent substrate and the second transparent conductive layer. The dielectric layer is disposed between the first transparent conductive layer and the second transparent conductive layer, the second transparent conductive layer has at least one opening in each pixel area positionally corresponding to the reflective pixel electrodes.

In the transflective liquid crystal display according to another embodiment of the invention, the dielectric layer is a color filter layer comprising a black matrix layer and a plurality of filter traces defined by the black matrix layer, and each filter trace positionally corresponds to one of the pixel areas. Further, the first transparent conductive layer is disposed between the second transparent substrate and the color filter layer.

In the transflective liquid crystal display according to another embodiment of the invention, the dielectric layer is a transparent layer. In one embodiment, the transflective liquid crystal display comprises a color filter layer comprising a black matrix layer and a plurality of filter traces defined by the black matrix layer. Each filter trace positionally corresponds to one of the pixel areas. In one embodiment, the color filter layer is disposed between the first transparent conductive layer and the second transparent substrate.

In the transflective liquid crystal display according to another embodiment of the invention, the reflective pixel electrodes are formed on the first transparent substrate within an area positionally corresponding to the openings.

In the transflective liquid crystal display according to another embodiment of the invention, the reflective pixel electrodes are formed between the first transparent substrate and the transparent pixel electrodes. Further, the transparent pixel electrodes cover the reflective pixel electrodes. In one embodiment, the first transparent conductive layer also has at least one opening in each pixel area.

According to the above embodiments, a pixel has two distinct areas that are applied with mutually different electric fields, so that it is possible to slow down the speed of lighting for the reflective area that often becomes bright faster. Accordingly, the gamma curves for the transmissive and reflective areas are optimized to effectively reduce the color washout and fingerprint mura.

Other purposes and benefits of the invention can be further understood by the technical features disclosed in the above-mentioned embodiments. In order to provide better and more obvious understanding of the purposes, features, and benefits of the invention, the detailed descriptions of the embodiments according to the invention will be given in the following together with figures.

DETAILED DESCRIPTION OF THE INVENTION

Note that, as used in the specification and the appended claims, the meaning of the phrase "layer A is formed or disposed on layer B" is not limited to a direct contact between the upper layer A and the lower layer B. For instance, in an embodiment where laminates are interposed between the upper layer A and the lower layer B is encompassed within the scope of the phrase "layer A is formed or disposed on layer B".

Figure 1A:
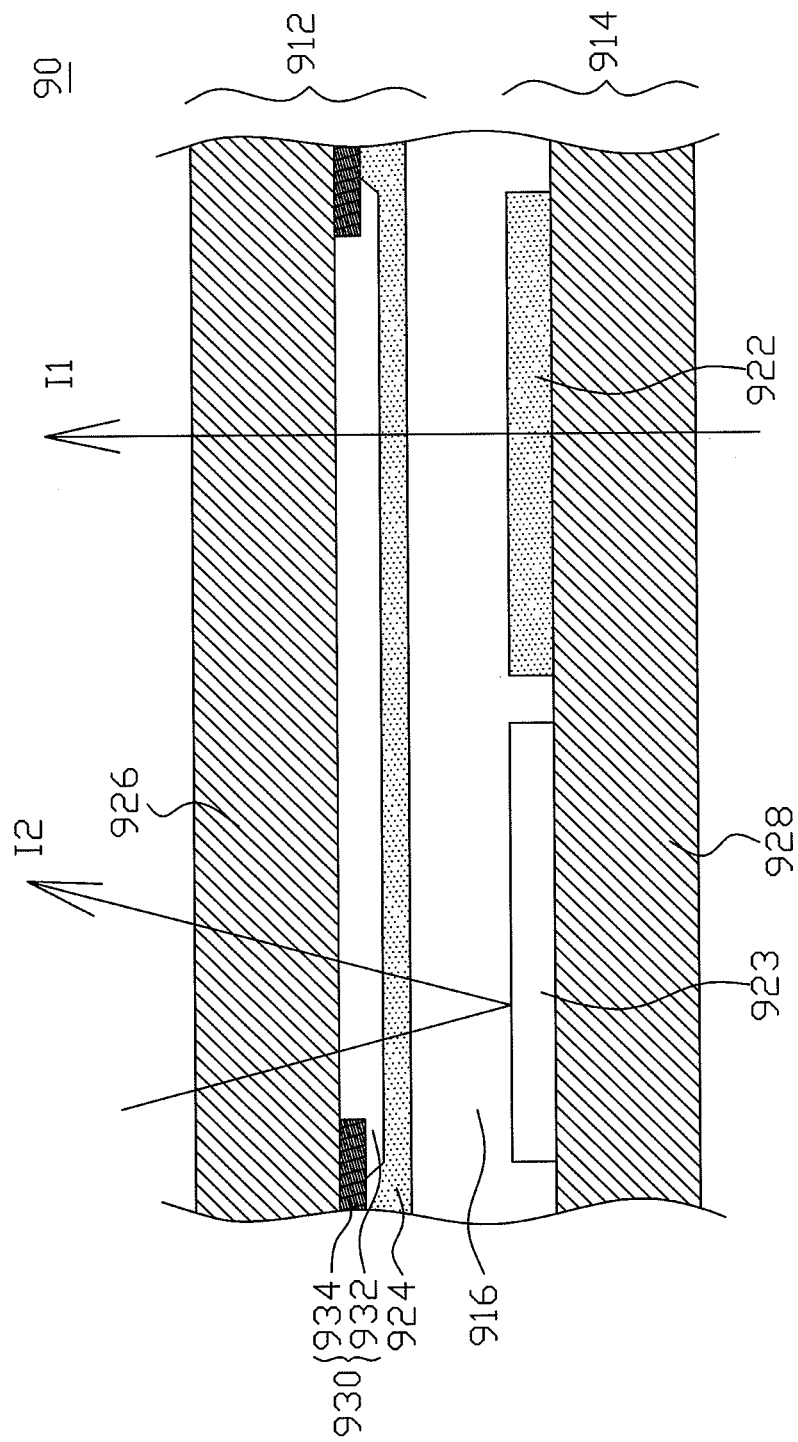
FIG. 1A partially shows a schematic cross-section of a conventional transflective liquid crystal display.
Figure 1B:
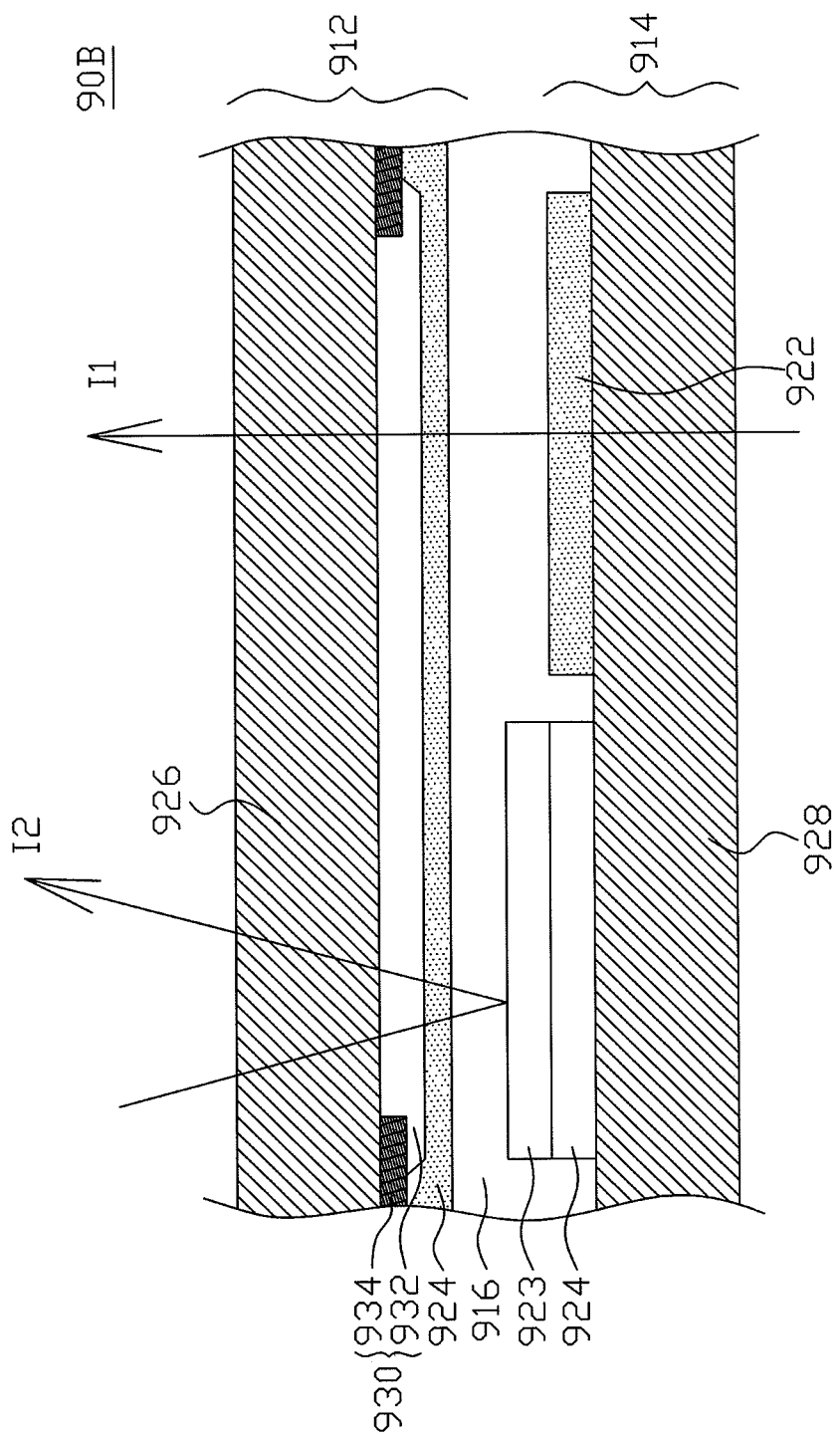
FIG. 1B partially shows a schematic cross-section of another conventional transflective liquid crystal display.
Figure 2:
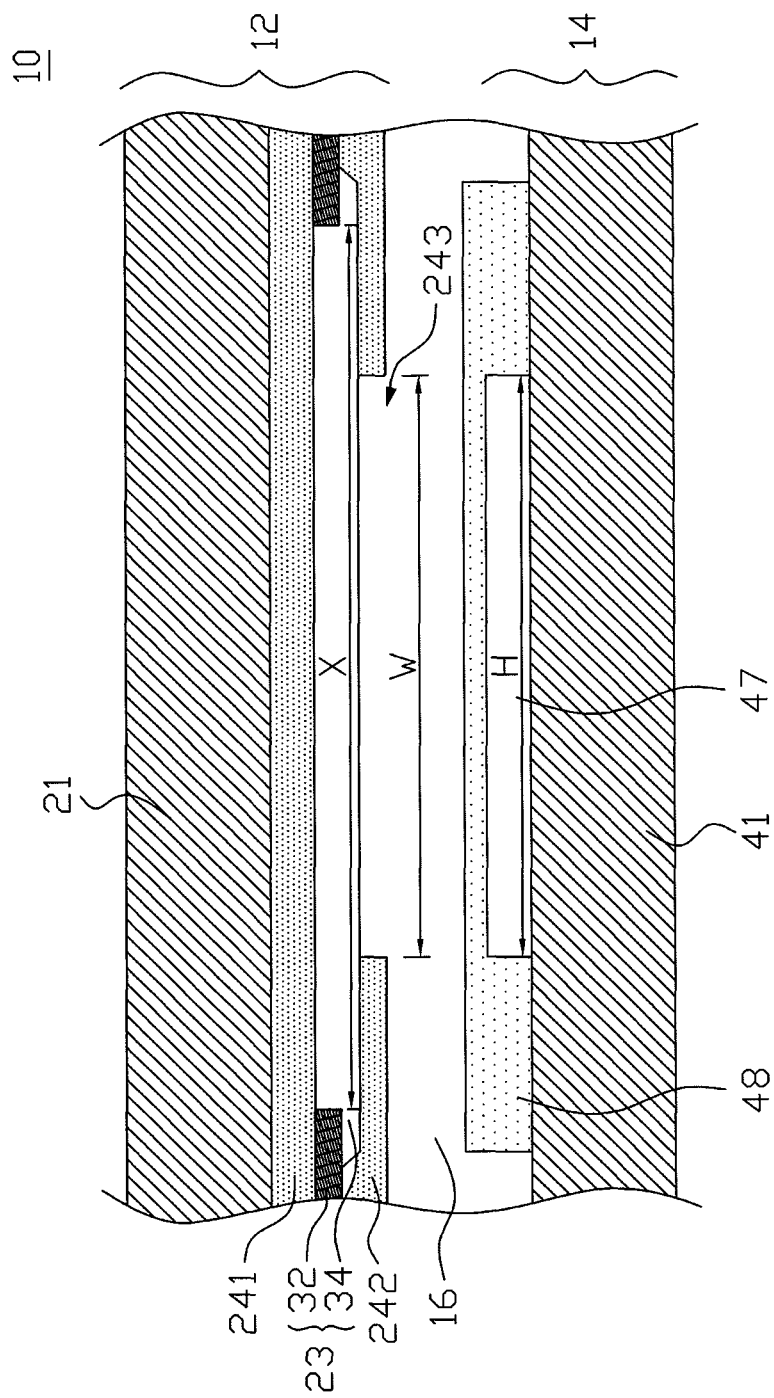
FIG. 2 partially shows a schematic cross-section of a transflective liquid crystal display according to an embodiment of the invention.

FIG. 2 partially shows a schematic cross-section of a transflective liquid crystal display according to an embodiment of the invention. Referring to FIG. 2, the transflective liquid crystal display 10 includes a color filter substrate 12, an array substrate 14 and a liquid crystal layer 16. The color filter substrate 12 and the array substrate 14 are opposite each other. The liquid crystal layer 16 is interposed between the substrates 12 and 14 and has negative dielectric anisotropy, so that the liquid crystal molecules are in vertical alignment when a voltage is not applied thereto. Chiral dopant may be added into the liquid crystal layer 16 to speed up the rotational motion of the liquid crystal molecules and reduce the disclination.

Figure 3:
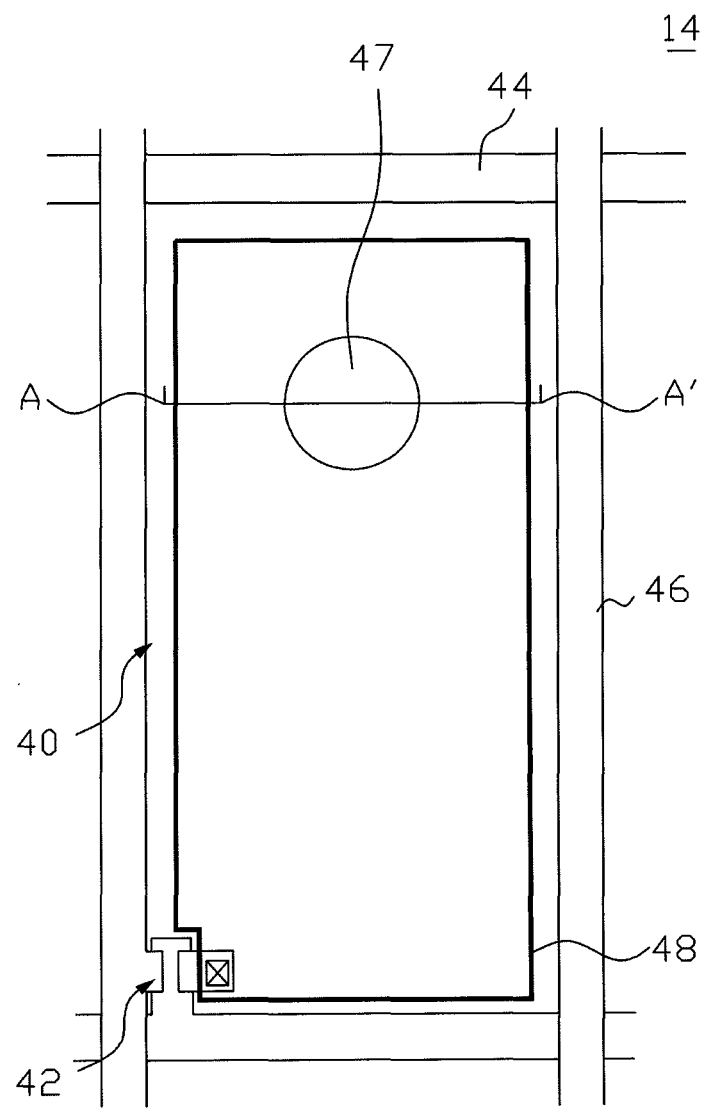
FIG. 3 shows a top view of a pixel structure on the array substrate of a transflective liquid crystal display according to an embodiment of the invention.

FIG. 3 shows a top view of a pixel structure on the array substrate of a transflective liquid crystal display according to an embodiment of the invention. In this embodiment, the switching device may be an n-type a-Si TFT 42. Referring to FIGS. 2 and 3, a plurality of parallel scan lines 44 and a plurality of parallel data lines 46 are formed on a first transparent substrate 41 of the array substrate 14. Two adjacent scan lines 44 and two adjacent data lines 46 perpendicular to the two adjacent scan lines 44 define a pixel area 40. A reflective pixel electrode 47 and a transparent pixel electrode 48 are disposed in the pixel area 40, and a TFT 42 connected to the pixel electrode 48 is disposed adjacent to the intersection of a scan line 44 and a data line 46. The transparent pixel electrode 48 may be made of a transparent conductive layer, such as indium tin oxide (ITO) or indium zinc oxide (IZO). The reflective pixel electrode 47 for reflecting the light beam from the outside of the transflective liquid crystal display 10 is disposed between the transparent pixel electrode 48 and the first transparent substrate 41. In one embodiment, the reflective pixel electrode 47 is covered by the transparent pixel electrode 48.

Figure 4:
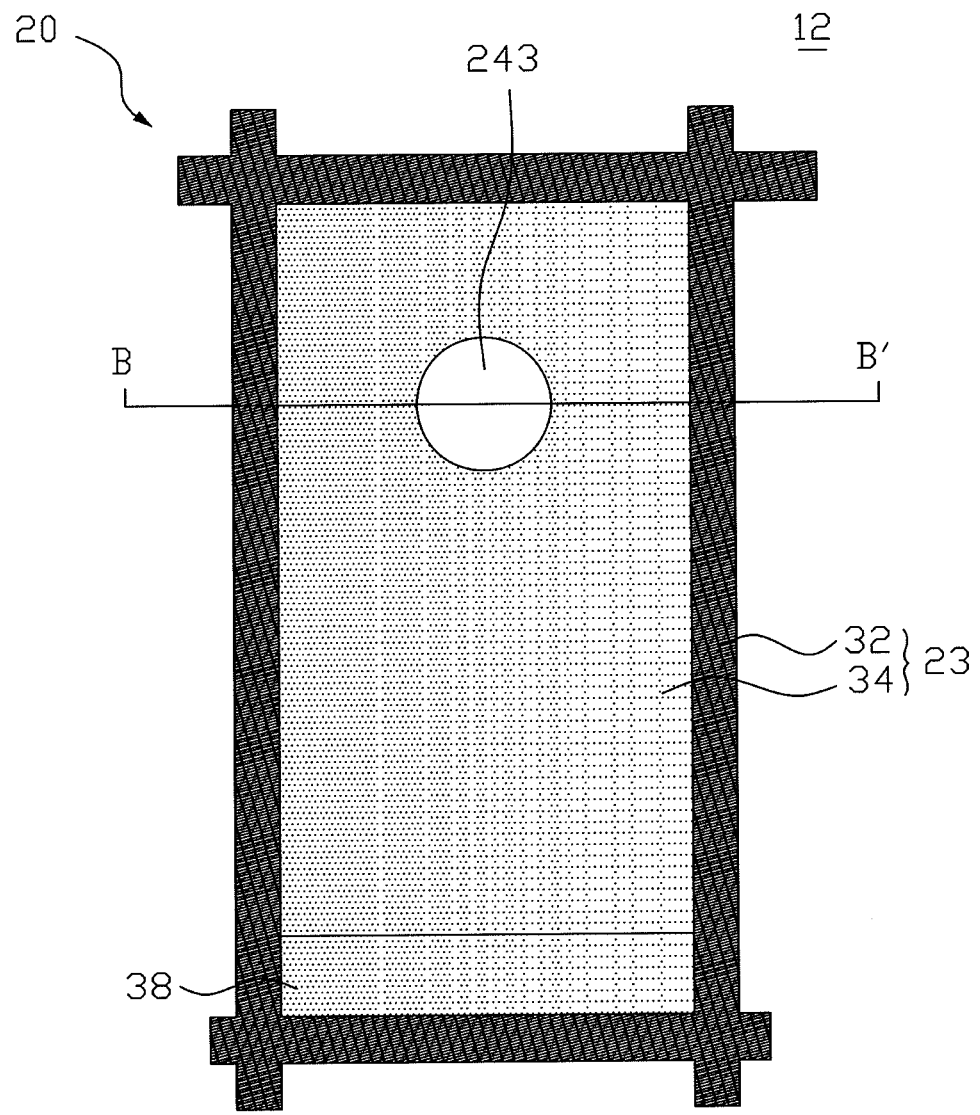
FIG. 4 shows a top view of a pixel area on the color filter substrate of a transflective liquid crystal display according to an embodiment of the invention.

FIG. 4 shows a top view of a pixel area on the color filter substrate of a transflective liquid crystal display according to an embodiment of the invention. Referring to FIGS. 2 and 4, the color filter substrate 12 has a plurality of pixel areas 20. Each pixel area 20 positionally corresponds to one of the pixel areas 40. Specifically, each pixel area 20 positionally corresponds to one of transparent pixel electrodes 48 and one of the reflective pixel electrodes 47 on the array substrate 14. In the color filter substrate 12, a color filter layer 23 is formed on a second transparent substrate 21. The color filter layer 23 includes a black matrix layer 32 and a plurality of filter traces 34 defined by the black matrix layer 32. Each filter trace 34 positionally corresponds to one of the pixel areas 20. The filter trace 34 includes an area 38 that positionally corresponds to the TFT 42 on the array substrate 14 after the color filter substrate 12 and the array substrate 14 are assembled into the transflective liquid crystal display 10. Each filter trace 34 may be made of materials having different colors, so that the filter traces 34 may include red filter traces, green filter traces and blue filter traces, for example. The black matrix layer 32 is disposed between two filter traces 34 for shielding light. In this embodiment, the first and second transparent substrates 41 and 21 may be a glass substrate, a plastics substrate or plastics flexible sheet.

Specifically, the schematic cross-section of the array substrate 14 in FIG. 2 is the cross-section cut along the line A-A' in FIG. 3, and the schematic cross-section of the color filter substrate 12 in FIG. 2 is the cross-section cut along the line B-B' in FIG. 4. The color filter substrate 12 has a plurality of pixel areas 20, and each pixel area 20 positionally corresponds to one of the pixel electrode 48. As shown in FIG. 2, the color filter substrate 12 includes a second transparent substrate 21, a first transparent conductive layer 241, a second transparent conductive layer 242 and a color filter layer 23 that may be a dielectric layer. The first transparent conductive layer 241 is disposed between the second transparent substrate 21 and the second transparent conductive layer 242, and the color filter layer 23 is disposed between the first transparent conductive layer 241 and the second transparent conductive layer 242. A filter trace 34 of the color filter layer 23 positionally corresponds to a pixel area 20. In one embodiment, the first transparent conductive layer 241 is formed on the second transparent substrate 21. The color filter layer 23 is formed on the first transparent conductive layer 241. The second transparent conductive layer 242 is formed on the color filter layer 23.

In this embodiment, the color filter layer 23 that may be a dielectric layer is disposed between the first transparent conductive layer 241 and the second transparent conductive layer 242, so that a capacitor is formed between the first transparent conductive layer 241 and the second transparent conductive layer 242. In addition, the second transparent conductive layer 242 also has at least one opening 243 that positionally corresponds to the reflective pixel electrode 47. The pixel area 20 and the pixel electrode 48 can be divided into a first area and a second area. The first area has the opening 243 in the second transparent conductive layer 242 in the pixel area 20, and the second area does not have the opening 243 in the second transparent conductive layer 242 in the pixel area 20. Since the first area and second area have capacitances different to each other, the electric field between the pixel electrode 48 and the first area is different to the electric field between the pixel electrode 48 and the second area. Accordingly, the liquid crystal molecules of the liquid crystal layer 16 in the first area and the second area are orientated towards mutually different directions. The two areas have different light transmittances due to the different orientations of liquid crystal molecules to reduce color washout. In addition, when the liquid crystal display is touched by a finger of a user, the fingerprint mura occurs due to disordered liquid crystal molecules. Since the pixel area 20 forms two different electric fields, it is easy for the liquid crystal molecules to return to their original direction so as to reduce the fingerprint mura.

The shapes of the opening 243 and the reflective pixel electrode 47 may not be the same and are not limited. For example, the opening 243 and the reflective pixel electrode 47 may have a circular shape, a striped shape, or an irregular shape. The location of the opening 243 is also not limited, and the opening 243 positionally corresponding to the reflective pixel electrode 47 is sufficient to achieve above mentioned functions. Although the opening 243 in FIG. 4 is disposed in the upper portion of the pixel area 20, the opening 243 may be disposed in the lower portion or middle portion of the pixel area 20. The number of the openings 243 is also not limited. The pixel area 20 may have a plurality of openings 243 located in different portions of the pixel area 20. The pixel area 20 may be formed as one area or be divided into an upper portion and a lower portion, as shown in an embodiment of FIG. 8.

As shown in FIGS. 2, 3 and 4, the opening 243 and the reflective pixel electrode 47 are in the shape of a circle. In this cross-section, the diameter of the opening 243 is W, the width of the filter trace 34 is X, and the width of the reflective pixel electrode 47 is H. The size of the opening 243 and the reflective pixel electrode 47 are not limited. In an embodiment, the reflective pixel electrode 47 is located in the area positionally corresponding to the opening 243 on the first transparent substrate 41, and the width H is smaller than the width W.

Figure 5:
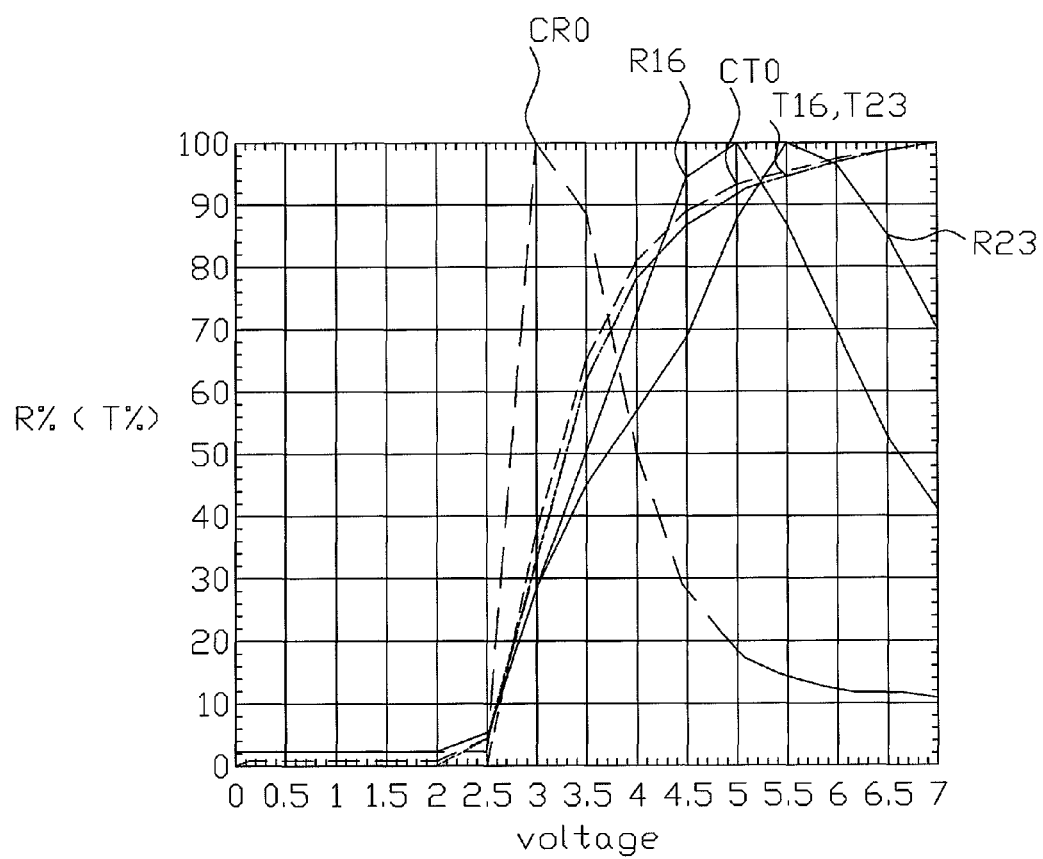
FIG. 5 shows a voltage versus transmittance (T %) and reflectance (R %) curves of a pixel at a normal viewing angle in a transflective liquid crystal display according to an embodiment of the invention.

FIG. 5 shows a voltage versus transmittance (T %) and reflectance (R %) curves of a pixel at a normal viewing angle in a transflective liquid crystal display according to an embodiment of the invention. The curves T16 and T23 are substantially overlapped. Specifically, FIG. 5 shows the curves obtained from simulation results at a normal viewing angle, where the aperture ratio of H:W:X=30:30:60 is used. The curves CR0 and CT0 are voltage versus transmittance (T %) and reflectance (R %) curves according to the conventional art that does not include a dielectric layer; that is, the thickness of the dielectric layer is zero. The curves R16 and T16 are voltage versus transmittance (T %) and reflectance (R %) curves according to an embodiment of the invention that includes a dielectric layer 23 having a thickness of 16000 length unit and disposed between the first transparent conductive layer 241 and the second transparent conductive layer 242. The curves R23 and T23 are voltage versus transmittance (T %) and reflectance (R %) curves according to an embodiment of the invention that includes a dielectric layer 23 having a thickness of 23000 length unit and disposed between the first transparent conductive layer 241 and the second transparent conductive layer 242. As shown in FIG. 5, compared with the conventional art, the curves R16 and T16 are relatively close to each other, the curves R23 and T23 are relatively close to each other, and these curves are also relatively close to the transmittance curve CT0 of the conventional art. According to the conventional art, a pixel only has one area and one electric field, so that the reflective area is relatively bright at a relatively low voltage (high lighting speed). In contrast, according to an embodiment of the invention, a pixel has two distinct areas that are applied with mutually different electric fields, so that it is possible to slow down the speed of lighting for the reflective area that often becomes bright faster. In one embodiment, the reflective area has the brightest brightness at the voltage of about 5V to well fit the transmittance curve. As a result, the curves R16 and T16 are relatively close to each other and the curves R23 and T23 are relatively close to each other, so that the gamma values of the transmissive and the reflective areas are allowed to adjust to form a better gamma curve.

Table 1 shows the contrasts of a transmissive area and a reflective area of a pixel at different driving voltages according to the conventional art and an embodiment of the invention.

As shown in table 1, the reflective area in a pixel has the highest contrast at 3V and the transmissive area in a pixel has the highest contrast at 7V according to the conventional art. On the contrary, the reflective area has the highest contrast at a voltage of 5.5V and the transmissive area has the highest contrast at 7V in a pixel according to this embodiment. Accordingly, in a pixel of this embodiment, the lighting speed of the reflective area that originally becomes bright faster is reduced. In addition, the voltage at which the reflective area has the highest contrast is closer to the voltage at which the transmissive area has the highest contrast, compared with the conventional art.

TABLE 1

| Structure\Voltage | 1 V | 2 V | 2.5 V | 3 V | 4 V |
|---|---|---|---|---|---|
| contrast of transmissive area in conventional art | 1.25 | 1.25 | 3.25 | 618.00 | 131.80 |
| contrast of reflective area in conventional art | 1.00 | 1.00 | 1.00 | 47.33 | 23.42 |
| contrast of transmissive area in this embodiment | 1.22 | 1.25 | 63.61 | 562.00 | 1260.87 |
| contrast of reflective area in this embodiment | 1.00 | 1.00 | 2.44 | 12.55 | 25.18 |

| Structure\Voltage | 5 V | 5.5 V | 6 V | 7 V |
|---|---|---|---|---|
| contrast of transmissive area in conventional art | 1507.36 | 1550.82 | 1581.05 | 1619.96 |
| contrast of reflective area | 8.60 | 6.63 | 5.77 | 5.22 |

TABLE 1-continued

| | | | | |
|---|---|---|---|---|
| in conventional art | | | | |
| contrast of transmissive area in this embodiment | 1478.26 | 1528.18 | 1563.61 | 1610.31 |
| contrast of reflective area in this embodiment | 39.35 | 44.69 | 43.35 | 31.15 |

Figure 6A:
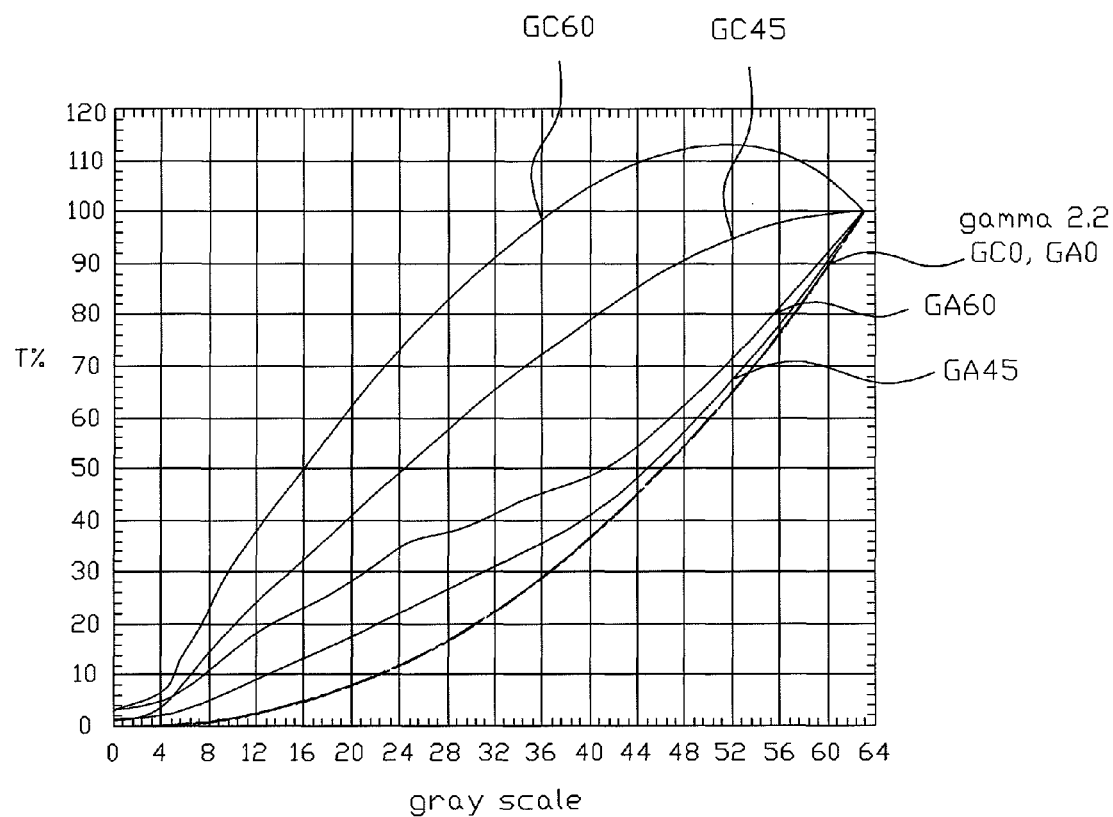
FIG. 6A shows a gray scale versus transmittance curve of a pixel in a transflective liquid crystal display according to an embodiment of the invention.

FIG. 6A shows a gray scale versus transmittance curve of a pixel in a transflective liquid crystal display according to an embodiment of the invention. Referring to 6A, the curves GA0, GA45 and GA60 are respectively obtained at viewing angles of 0, 45 and 60 degrees according to the embodiment of FIG. 2. The curves GC0, GC45 and GC60 are respectively obtained at viewing angles of 0, 45 and 60 degrees according to the conventional art. As shown in FIG. 6A, each curve of the embodiment of the invention is closer to a standard curve Gamma 2.2 and the curve T0 of the conventional art at a viewing angle of 0 degree than other curve of the conventional art is. Note that the curves GA0, GC0 and Gamma 2.2 are approximately overlapped to each other.

Figure 6B:
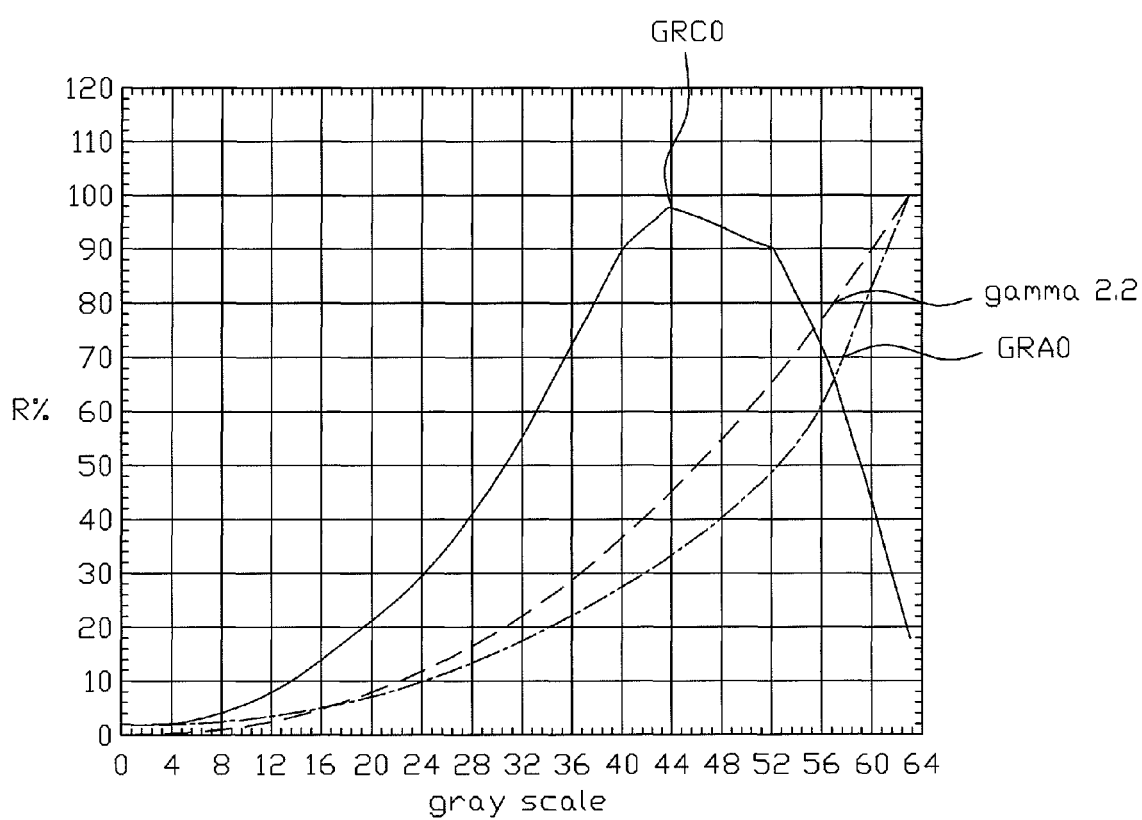
FIG. 6B shows a gray scale versus reflectance curve of a pixel in a transflective liquid crystal display according to an embodiment of the invention.

FIG. 6B shows a gray scale versus reflectance curve of a pixel in a transflective liquid crystal display according to an embodiment of the invention. Referring to 6B, the curve GRA0 is obtained at viewing angle of 0 degree according to the embodiment of FIG. 2. The curve GRC0 is obtained at viewing angles of 0 degree according to the conventional art, and the standard curve Gamma 2.2 is also shown. As shown in FIG. 6B, the curve GRA0 of the embodiment of the invention is closer to the curve Gamma 2.2 than the curve GRC0 of the conventional art are, so that the gamma curve of the transmissive and reflective areas of an embodiment of the invention is closer to the curve Gamma 2.2 compared with the conventional art.

As shown in FIG. 5, the thickness of the dielectric layer may affect voltage versus transmittance (T %) and reflectance (R %) curves. Accordingly, the thickness of the dielectric layer may vary according to different design of products. In the embodiment of FIG. 2, when the thickness of the color filter layer 23 that may be a dielectric layer is changed, the image quality may be also affected. To solve this problem, one may choose the embodiment of FIG. 7.

Figure 7:
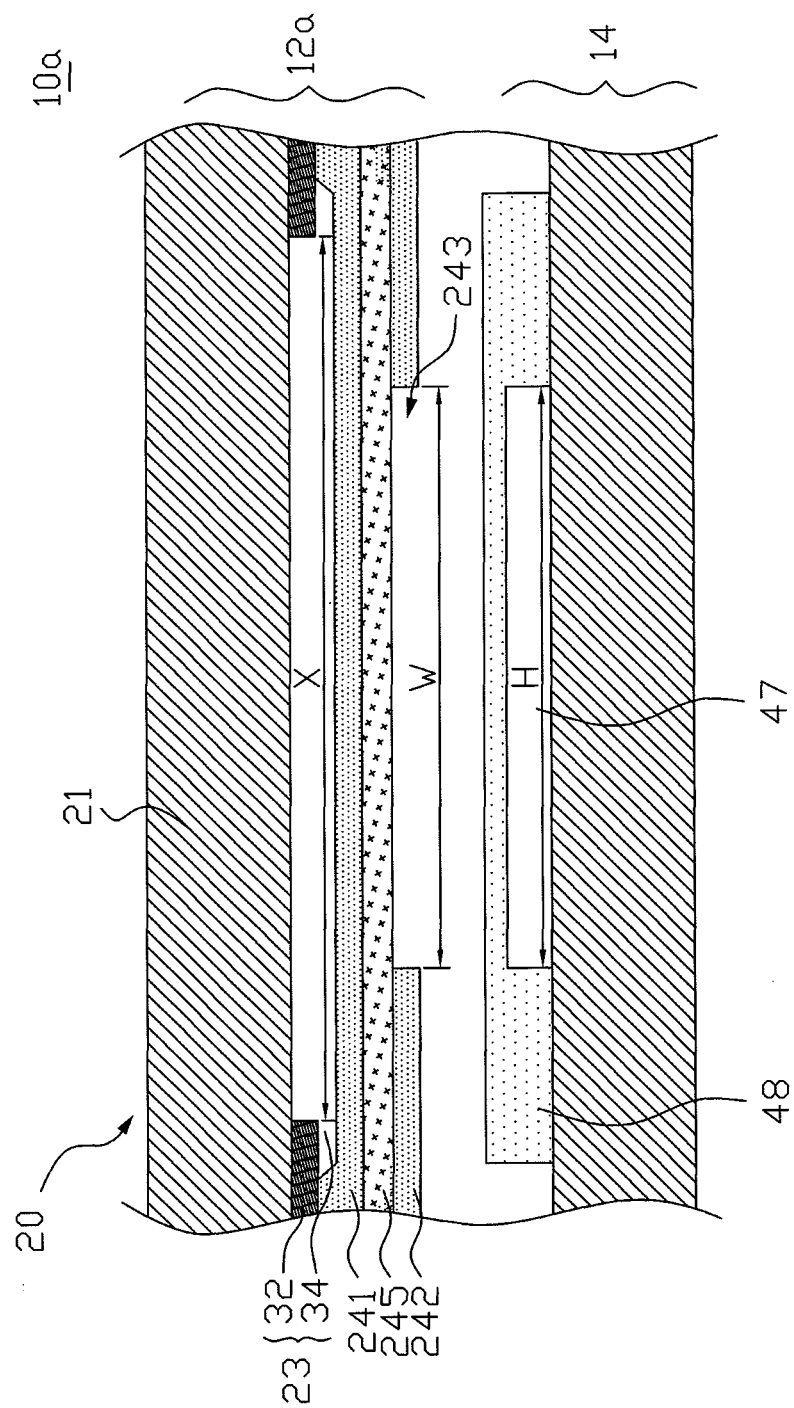
FIG. 7 partially shows a schematic cross-section of a transflective liquid crystal display according to an embodiment of the invention.

FIG. 7 partially shows a schematic cross-section of a transflective liquid crystal display according to an embodiment of the invention. The transflective liquid crystal display 10a and the color filter substrate 12a in FIG. 7 are similar to the liquid crystal display 10 and the color filter substrate 12 in FIG. 2, and therefore the same numerical reference designates the same member and the descriptions of the same portion will be omitted. Only the portion that is different between the two transflective liquid crystal displays and the two color filter substrates will be described in the following. As shown in FIG. 7, the color filter substrate 12a of the liquid crystal display 10a is different from the color filter substrate 12 of the liquid crystal display 10. In the color filter substrate 12a, the dielectric layer between the first transparent conductive layer 241 and the second transparent conductive layer 242 may be a transparent layer different form the color filter layer 23, and the color filter substrate 12a further comprises a color filter layer 23. Specifically, the color filter substrate 12a comprises a second transparent substrate 21, a first transparent conductive layer 241, a second transparent conductive layer 242, a dielectric layer 245 and a color filter layer 23. The first transparent conductive layer 241 is disposed between the second transparent substrate 21 and the second transparent conductive layer 242, and the dielectric layer 245 is disposed between the first transparent conductive layer 241 and the second transparent conductive layer 242. The color filter layer 23 is disposed between the first transparent conductive layer 241 and the second transparent conductive substrate 21. A filter trace 34 of the color filter layer 23 positionally corresponds to a pixel area 20. In a preferred embodiment, the color filter layer 23 is formed on the second transparent substrate 21. The first transparent conductive layer 241 is formed on the color filter layer 23. The dielectric layer 245 is formed on the first transparent conductive layer 241. The second transparent conductive layer 242 is formed on the dielectric layer 245. In this embodiment, the thickness of the dielectric layer 245 that may be a transparent layer is adjusted to improve the image quality, where the image quality has been affected due to the adjustment of the thickness of the color filter layer 23.

Figure 8:
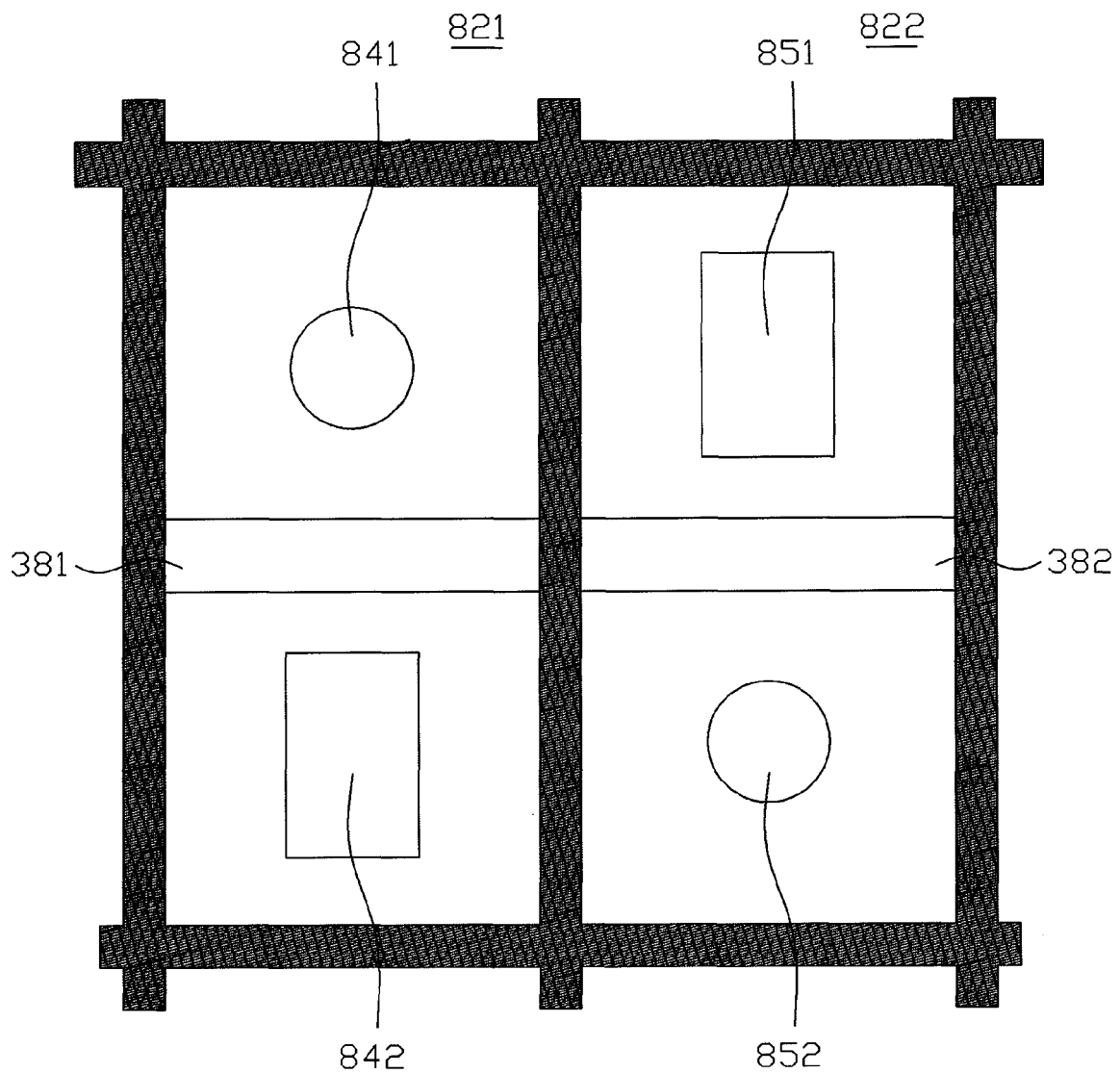
FIG. 8 shows a top view of two adjacent pixel areas on the color filter substrate of a transflective liquid crystal display according to an embodiment of the invention.
Figure 9:
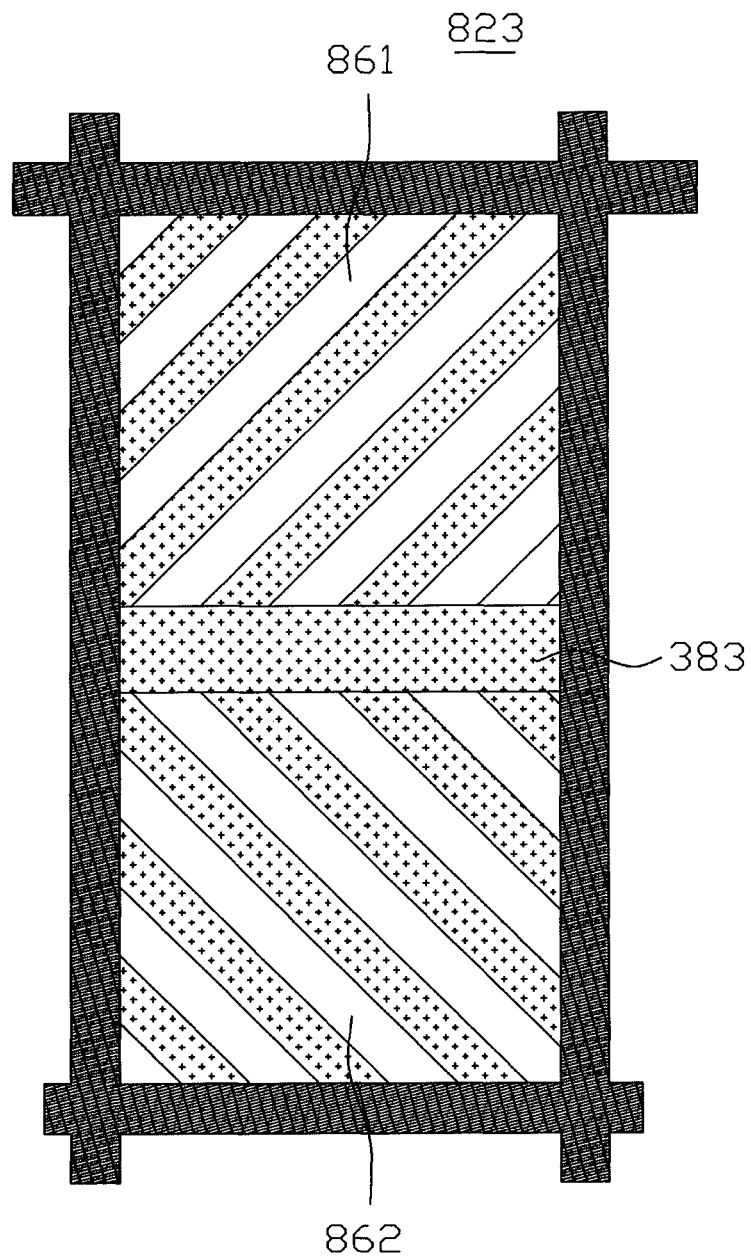
FIG. 9 shows a top view of a pixel area on the color filter substrate of a transflective liquid crystal display according to an embodiment of the invention.

FIG. 8 shows a top view of two adjacent pixel areas on the color filter substrate of a transflective liquid crystal display according to an embodiment of the invention. FIG. 9 shows a top view of a pixel area on the color filter substrate of a transflective liquid crystal display according to an embodiment of the invention. The two adjacent pixel areas 821 and 822 in FIG. 8 and the pixel area 823 in FIG. 9 are similar to the pixel area 20 in FIG. 4. The same members thereof are denoted by the same reference numerals and their detail explanation therefor is omitted. Referring to FIGS. 8 and 9, the pixel areas 821, 822 and 823 respectively include areas 381, 382 and 383 which divide these pixel areas into an upper portion and a lower portion. The areas 381, 382 and 383 positionally correspond to a switching device on the array substrate 14.

As shown in FIG. 8, the second transparent conductive layer 242 in the pixel areas 821 and 822 respectively has first openings 841 and 851 in the upper portion of the areas 381 and 382; and second openings 842 and 852 in the lower portion of the areas 381 and 382. The area of the second opening 842 (which is rectangle) is different from the area of the first opening 841 (which is circle). It is preferred that the pixel areas 821 and 822 are adjacent to each other, the area (or shape) of the first opening 841 in the pixel area 821 is similar to the area (or shape) of the second opening 852 in the pixel area 822, and the area (or shape) of the second opening 842 in the pixel area 821 is similar to the area (or shape) of the first opening 851 in the pixel area 822. In this arrangement, the openings having similar area (or being in similar shape) in the four parts of two adjacent pixel areas are alternately disposed in the longitudinal or latitudinal direction, so that uneven brightness problem is avoided when the difference between transmittances of any two of the four parts is relatively large. As shown in FIG. 9, the upper portion and the lower portion of the pixel area 823 respectively includes a plurality of first openings 861 and second openings 862 that are in the shape of a stripe. The first openings 861 and second openings 862 respectively have longitudinal axes which are different from each other. In one embodiment, the longitudinal axis of the first openings 861 and that of the second openings 862 are in symmetry with respect to the area 383. In this arrangement, uneven brightness problem is avoided. Note that the pixel areas are divided into upper and lower portions in this embodiment, however the invention is not limited thereto. In one embodiment, the pixel areas may not be divided into upper and lower portions. In the embodiments of FIGS. 8 and 9, the reflective pixel electrode 47 of the array substrate 14 positionally corresponds to the openings and its detailed description is omitted.

Figure 10:
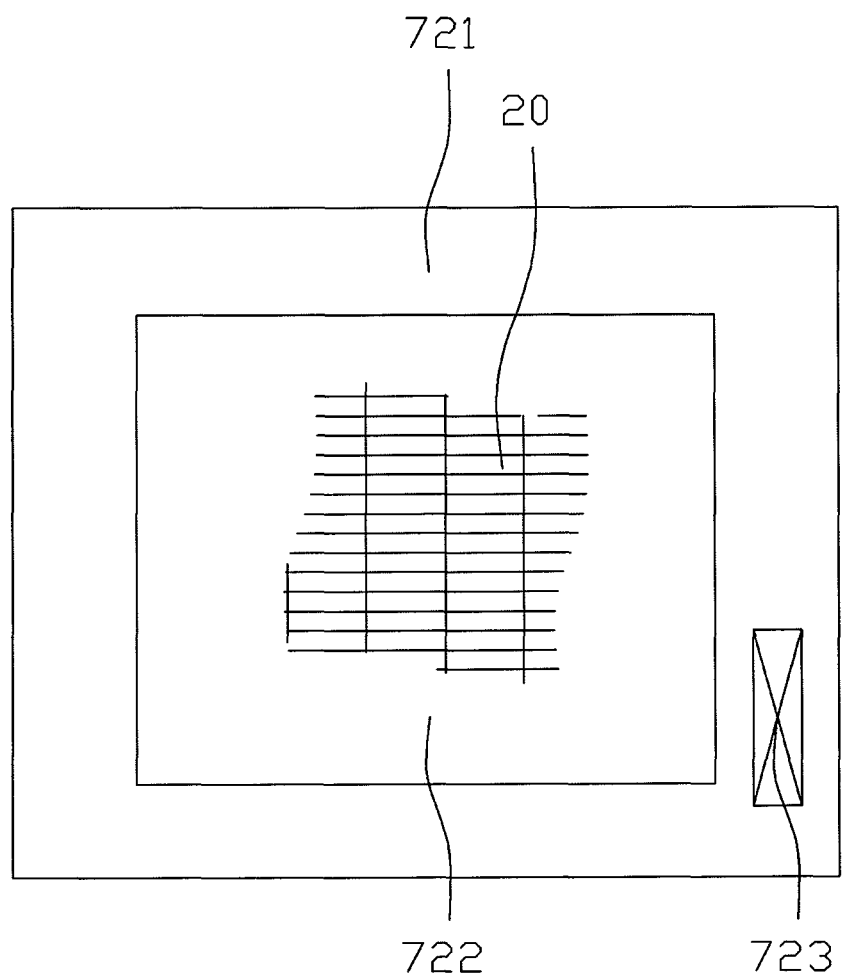
FIG. 10 shows a top view of the color filter substrate of a transflective liquid crystal display according to an embodiment of the invention.

FIG. 10 shows a top view of the color filter substrate of a transflective liquid crystal display according to an embodiment of the invention. The color filter substrate 712 in FIG. 10 is similar to the color filter substrate 12 in FIG. 2, and therefore the same numerical reference designates the same member of the color filter substrates and the descriptions of the same portion will be omitted. The color filter substrate 712 has a display area 722 and a non-display area 721. The display area 722 comprises the pixel areas 20. The non-display area 721 is the area that does not show any image in the liquid crystal display 10. The non-display area 721 has a via hole 723, and the first transparent conductive layer 241 and the second transparent conductive layer 242 of the color filter substrate 712 are electrically connected with each other through the via hole 723. The via hole 723 is disposed in the non-display area 721 so that the display quality of the liquid crystal display 10 is less likely to be impacted. According to this embodiment, the common voltage may be applied to only one of the first transparent conductive layer 241 and the second transparent conductive layer 242, and the other one may receive the common voltage through the via hole 723. As a result, a transparent conductive layer is additionally provided in this embodiment without increasing the number of TFT or IC, such that the portion between the pixel electrode 48 and the first and second portions of the pixel areas 20 may have two areas in which the liquid crystal molecules of the liquid crystal layer 16 are orientated to different directions. Compared with the conventional art, the aperture ratio of the color filter substrate 12 and the transflective liquid crystal display 10 is relatively large and the cost thereof is relatively low. In this embodiment, the non-display area 721 is positioned at the periphery of the color filter substrate 712 and surrounds the pixel areas 20.

In a transflective liquid crystal display according to an embodiment, the ratio of H:W:X may be adjusted to design a product. Compared with the conventional art, it is easier to improve the gamma curve of transmissive and reflective areas. The shape and size of the opening 243 and the reflective pixel electrode 47 may be adjusted to improve the gamma curve of transmissive and reflective areas. According to an embodiment of the invention, the width and diameter may be set as $X>W \geqq H$. According to another embodiment of the invention, the width and diameter may be set as $X>H \geqq W$.

Figure 11:
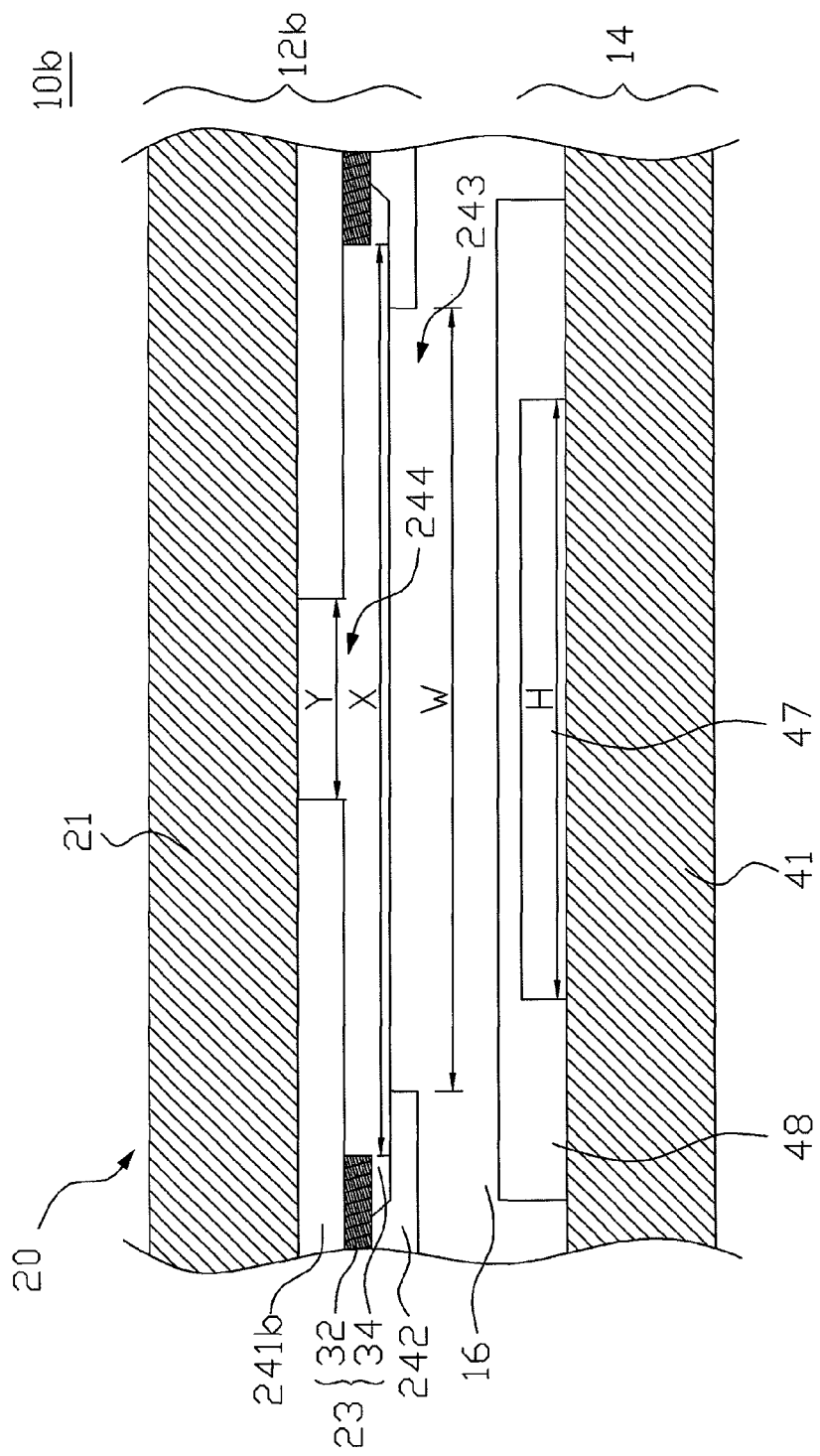
FIG. 11 partially shows a schematic cross-section of a transflective liquid crystal display according to an embodiment of the invention.

FIG. 11 partially shows a schematic cross-section of a transflective liquid crystal display according to an embodiment of the invention. The liquid crystal display 10b and the color filter substrate 12b in FIG. 11 are similar to the liquid crystal display 10 and the color filter substrate 12 in FIG. 2, and therefore the same numerical reference designates the same member in these transflective liquid crystal displays and the color filter substrates and the descriptions of the same members will be omitted. Only the portion that is different between the two color filter substrates will be described in the followings. In this embodiment, the first transparent conductive layer 241b of the color filter substrate 12b also has an opening 244 which has a diameter Y in the cross-section. It is preferred that the opening 244 positionally corresponds to the singular point in the electric field. The inventors discovers that, through experiments, the fingerprint mura at a voltage between 0V and 4V is significantly reduced in the liquid crystal display 10 according to the embodiment of FIG. 2. However, the degree of reduction of the fingerprint mura at a voltage between 4V and 5V is not significant compared to that at a voltage between 0V and 4V. On the contrary, the degree of reduction of the fingerprint mura at a voltage between 4V and 5V in the liquid crystal display 10b according to the embodiment of FIG. 11 is relatively significant compared to that in the liquid crystal display 10. As a result, it can be seen the fingerprint mura is further reduced according to the embodiment of FIG. 11.

In a transflective liquid crystal display according to an embodiment, the ratio of Y:H:W:X may be adjusted to design a product. Compared with the transflective liquid crystal display in FIG. 2, there is an additional variance Y to be used. However, the bigger the width Y of the opening 244 is, the smaller the transmissive area of the pixel area 20 is. The variances including the aperture ratio of cross-section, the thickness of the dielectric layer, and the shape of the opening may be adjusted and optimized when different products with different degree of color washout and fingerprint mura are designed.

Although the preferred embodiments of the invention has been fully described by way of examples with reference to the accompanying drawings, it should not be construed as any limitation on the implementation range of the invention. Various equivalent changes and modifications can be performed by those who are skilled in the art without deviating from the scope of the invention. The scope of the invention is to be encompassed by the claims of the invention. Any embodiment or claim of the invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A transflective liquid crystal display, comprising:
an array substrate, comprising:
a first transparent substrate;
a plurality of switching devices formed on the first transparent substrate;
a plurality of reflective pixel electrodes provided on the first transparent substrate; and
a plurality of transparent pixel electrodes provided on the first transparent substrate, wherein each switching device is electrically connected to one of the reflective pixel electrodes and one of the transparent pixel electrodes;
a color filter substrate having a plurality of pixel areas, wherein each pixel area positionally corresponds to one of the transparent pixel electrodes and at least one of the reflective pixel electrodes; and
a liquid crystal layer disposed between the array substrate and the color filter substrate,
wherein the color filter substrate comprises a second transparent substrate, a first transparent conductive layer, a second transparent conductive layer and a dielectric layer, the first transparent conductive layer is disposed between the second transparent substrate and the second transparent conductive layer, the dielectric layer is disposed between the first transparent conductive layer and the second transparent conductive layer, the first transparent conductive layer has at least one first opening in each pixel area, the second transparent conductive layer has at least one second opening in each pixel area, the second opening is positionally corresponding to the reflective pixel electrode in each pixel area, the first transparent conductive layer is electrically connected to the second transparent conductive layer, and the second opening overlaps both of the entire first opening and a part of the first transparent conductive layer.

2. The transflective liquid crystal display according to claim 1, wherein the dielectric layer is a color filter layer comprising a black matrix layer and a plurality of filter traces defined by the black matrix layer, and each filter trace positionally corresponds to one of the pixel areas.

3. The transflective liquid crystal display according to claim 2, wherein the first transparent conductive layer is disposed between the second transparent substrate and the color filter layer.

4. The transflective liquid crystal display according to claim 3, wherein the openings and the reflective pixel electrodes has a circular shape, a striped shape, or an irregular shape.

5. The transflective liquid crystal display according to claim 1, wherein the reflective pixel electrodes are formed on the first transparent substrate within an area positionally corresponding to the openings.

6. The transflective liquid crystal display according to claim 1, wherein the reflective pixel electrodes are formed between the first transparent substrate and the transparent pixel electrodes.

7. The transflective liquid crystal display according to claim 6, wherein the transparent pixel electrodes respectively cover the reflective pixel electrodes.

8. The transflective liquid crystal display according to claim 1, wherein the color filter substrate further comprises a non-display area having a via hole, and the first transparent conductive layer is electrically connected to the second transparent conductive layer through the via hole.

9. The transflective liquid crystal display according to claim 8, wherein the non-display area is positioned at the periphery of the color filter substrate and surrounds the pixel areas.

10. The transflective liquid crystal display according to claim 1, wherein each of the switching devices is a thin film transistor.

11. The transflective liquid crystal display according to claim 1, wherein the dielectric layer is a transparent layer.

12. The transflective liquid crystal display according to claim 11, further comprising a color filter layer having a black matrix layer and a plurality of filter traces defined by the black matrix layer, wherein each filter trace positionally corresponds to one of the pixel areas.

13. The transflective liquid crystal display according to claim 12, wherein the color filter layer is disposed between the first transparent conductive layer and the second transparent substrate.

* * * * *